US012737614B2

(12) United States Patent
Eggenberger et al.

(10) Patent No.: US 12,737,614 B2
(45) Date of Patent: Sep. 15, 2026

(54) FEATURES FOR BLACK-BOX MACHINE-LEARNING MODELS

(71) Applicant: INTERNATIONAL BUSINESS MACHINES CORPORATION, Armonk, NY (US)

(72) Inventors: Christian Eggenberger, Wil (CH); Frederik Frank Flöther, Schlieren (CH); Patrick Lustenberger, Herrliberg (CH); Saurabh Yadav, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 17/452,514

(22) Filed: Oct. 27, 2021

(65) Prior Publication Data

US 2023/0132070 A1 Apr. 27, 2023

(51) Int. Cl.

*G06N 3/08* (2023.01)
*G06F 18/21* (2023.01)
*G06V 10/75* (2022.01)

(52) U.S. Cl.

CPC ........... *G06N 3/08* (2013.01); *G06F 18/2163* (2023.01); *G06F 18/217* (2023.01); *G06V 10/751* (2022.01)

(58) Field of Classification Search

CPC ........ G06N 3/0895; G06N 3/09; G06N 3/091; G06N 3/092; G06N 3/094; G06N 3/096;

(Continued)

(56) References Cited

U.S. PATENT DOCUMENTS 9,466,033 B2 10/2016 Ananthanarayanan
2017/0061326 A1 3/2017 Talathi (Continued)

FOREIGN PATENT DOCUMENTS

CN 105210064 A 12/2015
CN 109299401 A 2/2019

(Continued)

OTHER PUBLICATIONS

Lingzhen Chen, Alessandro Moschitti, "Transfer Learning for Sequence Labeling Using Source Model and Target Data," arXiv:1902.05309 (Year: 2019).*

(Continued)

*Primary Examiner* — Kakali Chaki
*Assistant Examiner* — Robert N Day
(74) *Attorney, Agent, or Firm* — Jordan T. Schiller

(57) ABSTRACT

A method for enabling a transformation system, comprising a transformation model built for a first setting using first input values, to incorporate second feature values present in a second setting is disclosed. The method comprises providing training input data comprising second feature values as well as expected second results, providing a feature mapper comprising a machine-learning model, wherein output signals of the feature mapper are used as input signals for the transformation system, thereby building a combination of the feature mapper and the transformation model, training of the machine-learning model of the feature mapper using the training input data as input for the feature mapper and using the second results as expected output data of the transformation system, and deploying the combination of the feature mapper and the transformation system as a super machine-learning system comprising a super machine-learning model usable in the second setting.

23 Claims, 7 Drawing Sheets

(58) Field of Classification Search
CPC .... G06N 3/098; G06N 3/0985; G06V 10/751; G06F 18/217; G06F 18/2163
See application file for complete search history.

(56) References Cited

U.S. PATENT DOCUMENTS

| | | | | |
|---|---|---|---|---|
| 2019/0370665 | A1 | 12/2019 | Eli | |
| 2021/0117786 | A1 | 4/2021 | Schwarz et al. | |
| 2021/0406774 | A1* | 12/2021 | Browne | G06N 3/04 |
| 2022/0036534 | A1* | 2/2022 | Chakrabarty | G06T 5/77 |

FOREIGN PATENT DOCUMENTS

| | | | |
|---|---|---|---|
| CN | 111566683 | A | 8/2020 |
| CN | 112330523 | A | 2/2021 |
| CN | 112487217 | A | 3/2021 |
| CN | 118159984 | A | 6/2024 |
| EP | 1078355 | B1 | 10/2002 |
| EP | 4416639 | A1 | 8/2024 |
| JP | H0635889 | A | 2/1994 |
| JP | 2014-049118 | A | 3/2014 |
| JP | 2021-099559 | A | 7/2021 |
| JP | 2021-523468 | A | 9/2021 |
| JP | 2024-537000 | A | 10/2024 |
| TW | 1799330 | B | 4/2023 |
| WO | 9959141 | A1 | 11/1999 |
| WO | 2023/072574 | A1 | 5/2023 |

OTHER PUBLICATIONS

Ning, Zhenyuan, et al. “Multiscale context-cascaded ensemble framework (MsC 2 EF): application to breast histopathological image .” IEEE Access 7 (2019): 150910-150923. (Year: 2019).*

Gourab Kundu, Ming-wei Chang, Dan Roth, and Chenxiang Zhai, “A New Framework for Domain Adaptation without Model Retraining,” https://www.ideals.illinois.edu/items/46022/bitstreams/135932/object (Year: 2013).*

Taesik Na, Jong Hwan Ko, Saibal Mukhopadhyay, “Cascade Adversarial Machine Learning Regularized with a Unified Embedding,” arXiv:1708.02582v3 (Year: 2018).*

Guo, An, Lianghua Song, and Xiong Chen. “Learning similar tasks based on PPO by transferring trajectory.” 2019 IEEE 16th International Conference on Networking, Sensing and Control (Icnsc). IEEE, 2019. (Year: 2019).*

Gama, Joao, and Pavel Brazdil. “Cascade generalization.” Machine learning 41 (2000): 315-343. (Year: 2000).*

Zhu, Linchao, et al. “Learning to transfer learn: Reinforcement learning-based selection for adaptive transfer learning.” European Conference on Computer Vision. Cham: Springer International Publishing, 2020. (Year: 2020).*

Stickland, Asa Cooper, Xian Li, and Marjan Ghazvininejad. “Recipes for adapting pre-trained monolingual and multilingual models to machine translation.” Proceedings of the 16th Conference of the European Chapter of the Association for Computational Linguistics: Main vol. 2021. (Year: 2021).*

Pfeiffer, Jonas, et al. “Adapterfusion: Non-destructive task composition for transfer learning.” Proceedings of the 16th conference of the European chapter of the association for computational linguistics: main vol. 2021. (Year: 2021).*

Guo et al., “Learning Similar Tasks Based on PPO By Transferring Trajectory”, Proceedings of the 2019 IEEE 16th International Conference on Networking, Sensing and Control, May 9-11, 2019, 6 pages.

International Search Report and Written Opinion, International Application No. PCT/EP2022/078159, International Filing Date: Oct. 10, 2022, Mailing Date: Feb. 21, 2023, 11 pages.

Lu et al., “Knowledge Transfer in Vision Recognition: A Survey”, ACM Computing Surveys, vol. 53, No. 2, Article 37, Publication Date: Apr. 2020, 35 pages.

Zhuang et al., “A Comprehensive Survey on Transfer Learning”, arXiv:1911.02685v1, Nov. 7, 2019, 27 pages.

Response to communication pursuant to Rule 161(1) and 162 EPC dated Nov. 29, 2024, Application No. 22801101.1, 8 pages.

De Lange, et al., “A continual learning survey: Defying forgetting in classification tasks,” IEEE, Apr. 16, 2021, 29 pages, arXiv:1909.08383v3, DOI: 10.1109/TPAMI.2021.3057446, Retrieved from the Internet: < URL: https://arxiv.org/abs/1909.08383>.

Kundu, et al., “A New Framework for Domain Adaptation without Model Retraining ,” 2013, 10 pages, Retrieved from the Internet: <URL: https://www.ideals.illinois.edu/bitstream/handle/2142/46012/gene-adapt-without-retraining.pdf? sequence=2>.

Moschitti, “Updating neural networks to recognize new categories, with minimal retraining,” Amazon science [blog], Jan. 30, 2019 [accessed on Oct. 7, 2021], 10 pages.

Schulz, et al., “Extending deep learning to new classes without retraining,” Proceedings vol. 11418, Detection and Sensing of Mines, Explosive Objects, and Obscured Targets XXV, Apr. 24, 2020 [accessed on Oct. 7, 2021], 3 pages, Retrieved from the Internet: <URL: https://www.spiedigitallibrary.org/conference-proceedings-of-spie/11418/1141803/Extending-deep-learning-to-new-classes-without-retraining/10.1117/12.2558134.short>.

Taitelbaum, et al., “Adding New Classes Without Access to the Original Training Data with Applications to Language Identification,” Interspeech [conference], 2018, 5 pages, DOI: 10.21437/Interspeech.2018-1342, Retrieved from the Internet: <URL: https://www.eng.biu.ac.il/goldbej/files/2018/06/Interspeech_2018.pdf>.

Undisclosed Author, “Domain Adaptation and Retraining,” Modzy.com [blog], Nov. 20, 2020 [accessed on Oct. 7, 2021], 7 pages, Retrieved from the Internet: <URL: https://www.modzy.com/blog/domain-adaptation-and-retraining/>.

Undisclosed Author, “Training and Test Sets: Splitting Data,” Google.com, [accessed on May 10, 2021], 3 pages, Retrieved from the Internet: <URL: https://developers.google.com/machine-learning/crash-course/training-and-est-sets/splitting-data>.

Notice of Allowance, TW Application No. 111130166, filed Aug. 11, 2022, 6 pages.

Japan Patent Office, “Decision to Grant a Patent” Jan. 27, 2026, 03 Pages, JP Application No. 2024-515839.

* cited by examiner

Providing training input data comprising 2nd feature values relating to the 2nd features as well as expected 2nd results.
102

Providing a feature mapper comprising a machine-learning model.
104

Training of the machine-learning model of the feature mapper using the training input data as input for the feature mapper and using the second results as expected output data of the transformation system.
106

Deploying the combination of the feature mapper and the transformation system as a super machine-learning system.
108

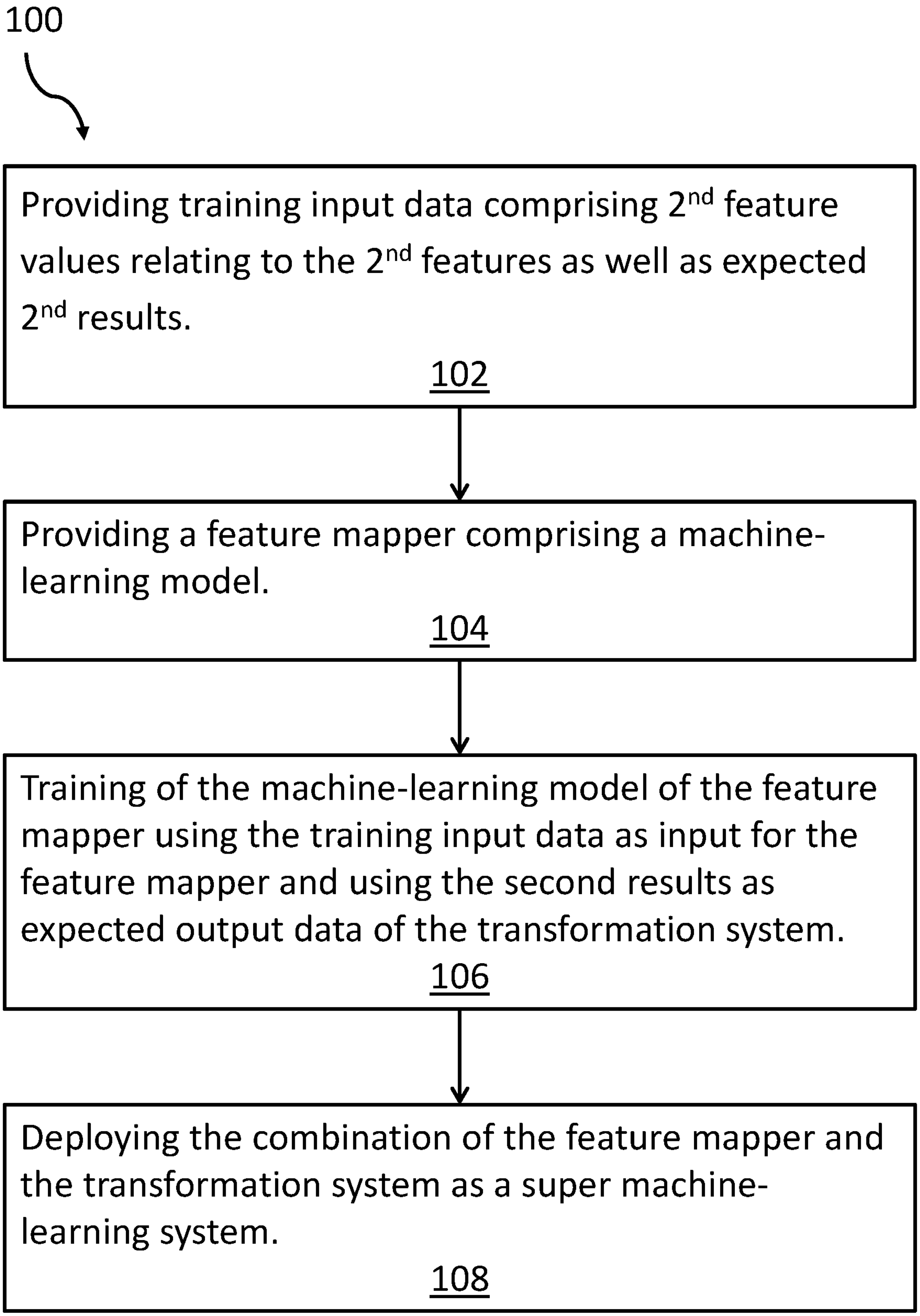

FIG. 1

FEATURES FOR BLACK-BOX MACHINE-LEARNING MODELS

BACKGROUND

The invention relates generally to a retraining of a black-box machine-learning (ML) mode for a new environment, and more specifically, to a computer-implemented method for enabling a transformation system comprising a transformation model built for a first setting using first input values, to incorporate second feature values present in a second setting. The invention relates further to a feature mapper creation system for enabling a transformation system and a computer program product.

Machine-learning remains one of the hottest topics in the IT (information technology) industry. It has also reached enterprise computing in production environments. Typically, machine-learning models and systems are trained with a set of training data specific to a certain setting making a series of assumptions in which it should be used. Due to the lack of skills in enterprises, such projects are often carried out by consulting companies which may not be available any longer if changes to the assumptions, i.e., the setting under which the training has been performed are essential. This may also happen if an ML project was successful in one environment, i.e., one setting and should not be applied to another setting, e.g., another subsidiary, other products, other customers, or another country and so on.

However, machine-learning (ML) systems comprising a trained machine-learning model are often black boxes which cannot be adapted easily to new environments. Hence, it is assumed here that the inner architecture (e.g., the structure of the neural network with regard to layers, weights, connections, etc.) is not known and cannot be influenced. It may also be assumed that an access to the original training dataset and the original feature set is not possible. Hence, the question arises: how can one adapt a black-box ML model to a new setting where the original features and the original training data are not available?

There are some disclosures that touch on the field of a computer-implemented method to enable a transformation system comprising a transformation model built for a first setting using first input values, to incorporate second feature values present in a second setting. E.g., document US2017/0061326A1 discloses a method for improving performance of a trained machine-learning model including adding a second classifier with the second objective function to the first classifier with a first objective function. Rather than minimizing a function of errors for the first classifier, the second objective function is used to directly reduce the number of errors of the first classifier.

Additionally, document US2019/0370665A1 discloses a method to mimic a pre-trained target model without access to the pre-trained target model or its original training dataset. The set of random or semi-random input data may be sent to randomly probe the pre-trained target model at a remote device. A set of corresponding output data may be received from the remote device that is generated by applying the pre-trained target model to the set of random or semi-random input data. Furthermore, a random probe training dataset may be generated comprising the set of random or semi-random input data and corresponding output data generated by randomly programming the pre-trained target model. Thereby, a new model can be trained with a random probe training dataset so that the new model may generate substantially the same corresponding output data and response to the input data to make the pre-trained target model.

However, also in this second publication only a model that mimics another existing model is created. Using an existing black-box ML model for another setting is not addressed.

Therefore, it may be necessary to overcome the limitations of the existing solutions and provide a solution to the above-stated question, namely, how to adapt a black-box ML model to a new setting; i.e., how to make it possible to use the inner architecture, the weighing, connections and other parameters that exist in the black-box ML model in a new environment with new features and new requirements?

SUMMARY

According to one aspect of the present invention, a computer-implemented method for enabling a transformation system, comprising a transformation model built for a first setting using first input values, to incorporate second feature values present in a second setting may be provided. The method may comprise providing training input data comprising second feature values relating to the second features as well as expected second results in the second setting and providing a feature mapper comprising a machine-learning model, wherein output signals of the feature mapper are used as input signals for the transformation system, thereby building a combination of the feature mapper and the transformation model.

Furthermore, the method may comprise training of the machine-learning model of the feature mapper using the training input data as input for the feature mapper and using the second results as expected output data of the transformation system and deploying the combination of the feature mapper and the transformation system as a super machine-learning system comprising a super machine-learning model usable in the second setting.

According to another aspect of the present invention, a feature mapper creation system for enabling a transformation system, comprising a transformation model built for a first setting using first input values, to incorporate second feature values present in a second setting may be provided. The feature mapper may comprise a processor and a memory, communicatively coupled to the processor, wherein the memory stores program code portions that, when executed, enable the processor, to provide training input data comprising second feature values relating to the second features as well as expected second results in the second setting, and to provide a feature mapper comprising a machine-learning model, wherein output signals of the feature mapper are used as input signals for the transformation system, thereby building a combination of the feature mapper and the transformation model.

The processor may also be enabled to train the machine-learning model of the feature mapper using the training input data as input for the feature mapper and using the second results as expected output data of the transformation system, and to deploy the combination of the feature mapper and the transformation system as a super machine-learning system comprising a super machine-learning model usable in the second setting.

The proposed computer-implemented method for enabling a transformation system, comprising a transformation model built for a first setting using first input values to incorporate second feature values present in a second setting, may offer multiple advantages, technical effects, contributions and/or improvements:

A transformation system—in particular, a trained machine-learning model/system—which may be trained for one setting, wherein the setting as well as the internal parameters of the ML model as well as the underlying features are unknown, may be reused using a feature mapper in order to use the black-box transformation system in a new context, a new environment and for new input features. This may be especially advantageous if a vendor or a consulting company may have sold a trained machine-learning model (or another form of transformation system) to a corporate customer and the original training data or the team that carried out the training is no longer accessible. In this case, the feature mapper may be instrumental in repurposing or recycling the original transformation system for the new setting.

There may be numerous cross-industry application areas, e.g., for banks and insurance companies but also environment surveying systems to recycle already existing trained machine-learning models for risk assessment or other tasks. The same may apply to property asset managers or real estate appraisers who perform property appraisals using a hedonic method (among other methods). It could also be the case that the underlying assumptions like legal rules and regulations may have changed so that only slight changes in the predictions may be required. With the proposed method and system, enterprises become self-enabled to adapt the old transformation system (e.g., based on a trained ML system) for a new setting under new conditions and with new input features.

In the following, additional embodiments of the inventive concept—applicable for the method as well as for the system—will be described.

According to one preferred embodiment of the method, the transformation system may be a machine-learning system comprising a trained machine-learning model which has been trained with first training data and related first results in the first setting. This may be the typical case for a black-box system from which no inner details are known. However, the transformation system may instead also be based on classical logic, e.g., procedurally programmed or implemented completely, or in parts, in digital logic. Hence, the transformation system may also be a rule-based or decision tree-based system. The beauty of the here proposed concept is therefore that not only ML models of unknown architecture and hyper-parameters may be adjusted—i.e., with the help of the feature mapper—to a new setting, but also more traditional decision-support systems.

According to an interesting embodiment of the method, internal details—such as the meaning of said first input values—of the transformation system—i.e., the black-box for which only the first setting may be known—are unknown at the point in time of the training of the machine-learning model of the feature mapper. Thus, the typical condition for existing decision-support or trained ML models may be given. Internal settings may be inaccessible and therefore protected against changes or direct re-training.

According to one advantageous embodiment of the method, a reinforcement learning method—and/or a related system—may be used for the training of the feature mapper. As a consequence, the feature behavior of the old black-box system together with the ML-based feature mapper may also be adapted to the new desired behavior using—only during the training period of the feature mapper—advanced ML technology in order to train the feature mapper so that it becomes adapted to use the functions and behaviors of the transformation model advantageously.

According to a further developed embodiment, the method may also comprise separating the provided training input data into (new) real training data and (related) testing data and validating the trained learning model of the feature mapper using the testing data. This may be a useful approach because the joint theoretical model of the feature mapper and the transformation system may also be tested after training, e.g., to define stop criterions for the training. However, under the proposed concept, it is not mandatory to perform this separation of the available new training dataset; however, it is a useful option.

According to another useful embodiment of the method, a stop criterion for the training of the ML model may be used. The stop criterion for the training of the machine-learning model of the feature mapper may be one selected out of the following group: a prediction threshold value, a threshold time value—i.e., a maximum training time—a learning iteration threshold value—i.e., a maximum number of learning cycles—an iteration improvement threshold value, i.e., is no longer possible to improve the in accuracy progress from iteration to iteration. Additionally, other stop criterions may be used which may be specific for certain application areas.

According to another interesting embodiment of the method, structured data, unstructured data and semi-structured data may be usable as input data for the feature mapper. Hence, every kind of input data—i.e., including images, sound, natural language, text as well as video streams—may be used, even if the existing transformation system may only be adapted to use simple features as input values. Hence, the combined system of the feature mapper and the transformation system may allow a wider variety of input data formats.

According to a further advantageous embodiment of the method, the number of input signals to the feature mapper may be larger or smaller if compared to the number of input signals to the transformation model. Therefore, there is no requirement for a one-to-one relationship between input features of the transformation system and the new feature mapper. Any combination may be possible.

According to an advanced embodiment, the method may also comprise a type of partial feature mapper. For this, the method may comprise providing a first portion of the second feature values during the training of the machine-learning model to the input terminals of the feature mapper and providing a remaining portion of the second feature values during the training of the machine-learning model directly to input terminals of the transformation system. Thus, some of the new input data are fed directly to the transformation system, whereas another sub-set of the same input dataset is used as input values for the feature mapper. This may allow a mixed mode of the combination of the feature mapper and the black-box transformation system. Such a setup may be useful for a case in which only a portion of the input features may be changed due to the new setting.

According to an optional embodiment of the method, the transformation system as well as the feature mapper may be a classifier. This may be a typical setup and use case for the here proposed system. However, the proposed concept may also provide satisfactory results for other types of decision-support systems and/or an ML architecture, in particular for the feature mapper.

According to another further developed embodiment, the method may also comprise initializing—so to speak as a pre-learning step of the feature mapper alone without any involved reinforcement learning system—the learning model of the feature mapper with a small number—e.g., <10, or, e.g., 3—of input datasets for the feature mapper and a small number of related prediction results of the feature mapper. These shall be equivalent to the expected input value for the transformation system in order to generate correct transformation system outputs, i.e., predictions that are expected after tuning the feature mapper in a reinforcement learning setup together with the transformation system.

According to a further enhanced embodiment of the method, the feature mapper may be a cascaded feature mapper comprising a first feature mapper and a second feature mapper. This way, the combination of the initially used feature mapper and the original untouched and unchanged transformation system may again be adapted for another new setting without changing the first feature mapper. This may be useful, if also the training dataset and/or the internal architecture, etc. of the first feature mapper are lost or not accessible. In such a case, a new feature mapper—i.e., the second feature mapper—may be used to adapt the already existing combination of the first feature mapper and the original transformation system for a further and new setting. This may also have the advantage that by the time the second feature mapper may be designed and trained, the technology may be so advanced that new characteristics of the second feature mapper may already be reflected. Hence, this idea may be described as future-proven. In other words, this cascaded model in this cascaded system may be denoted as super-super ML model.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject—matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings:

FIG. 1 depicts a block diagram of an embodiment of the inventive computer-implemented method for enabling a transformation system to incorporate second feature values present in a second setting.

Figure 2:
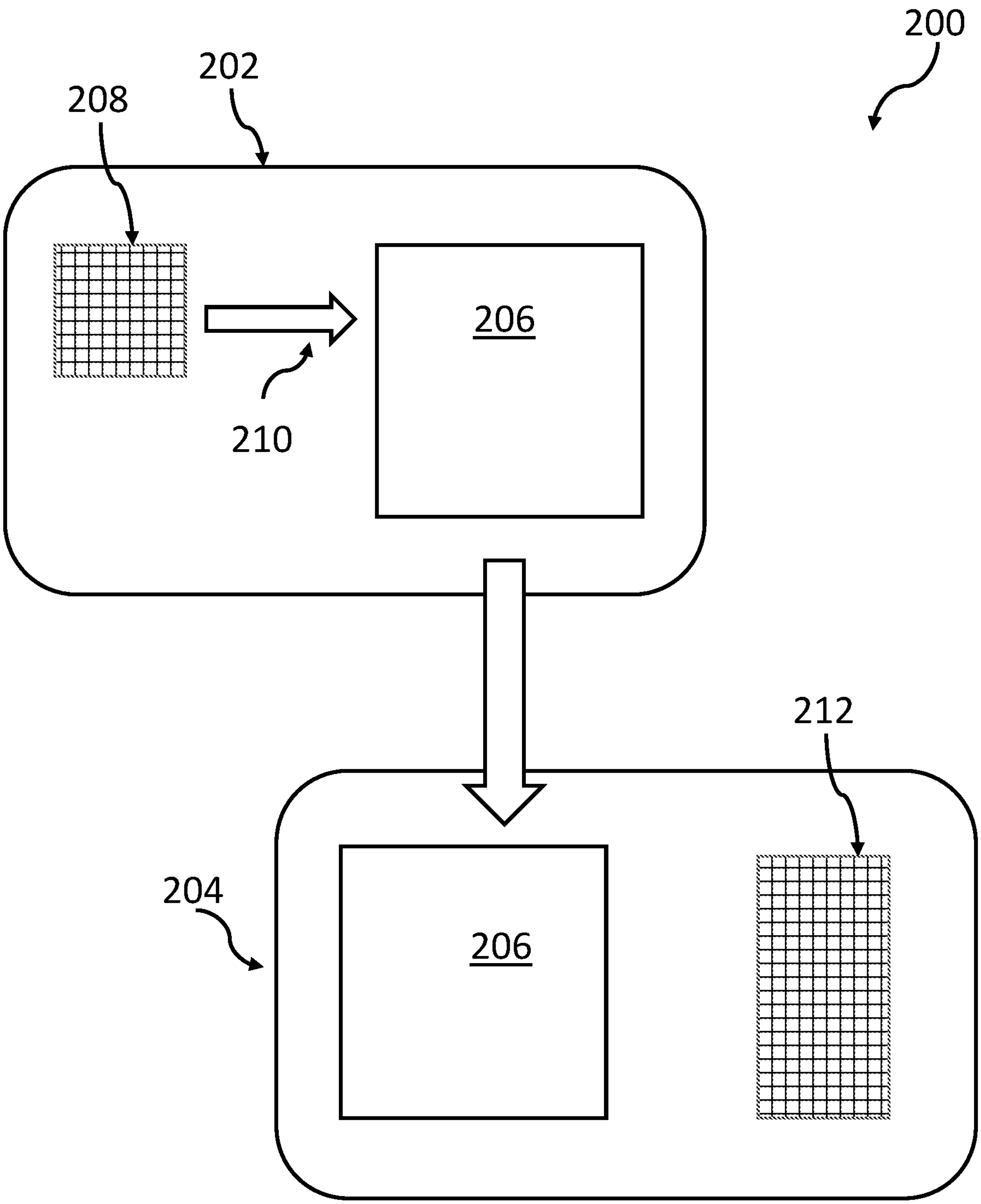

FIG. 2 depicts a block diagram of the assumed setting to be overcome with the here proposed concept.

Figure 3:
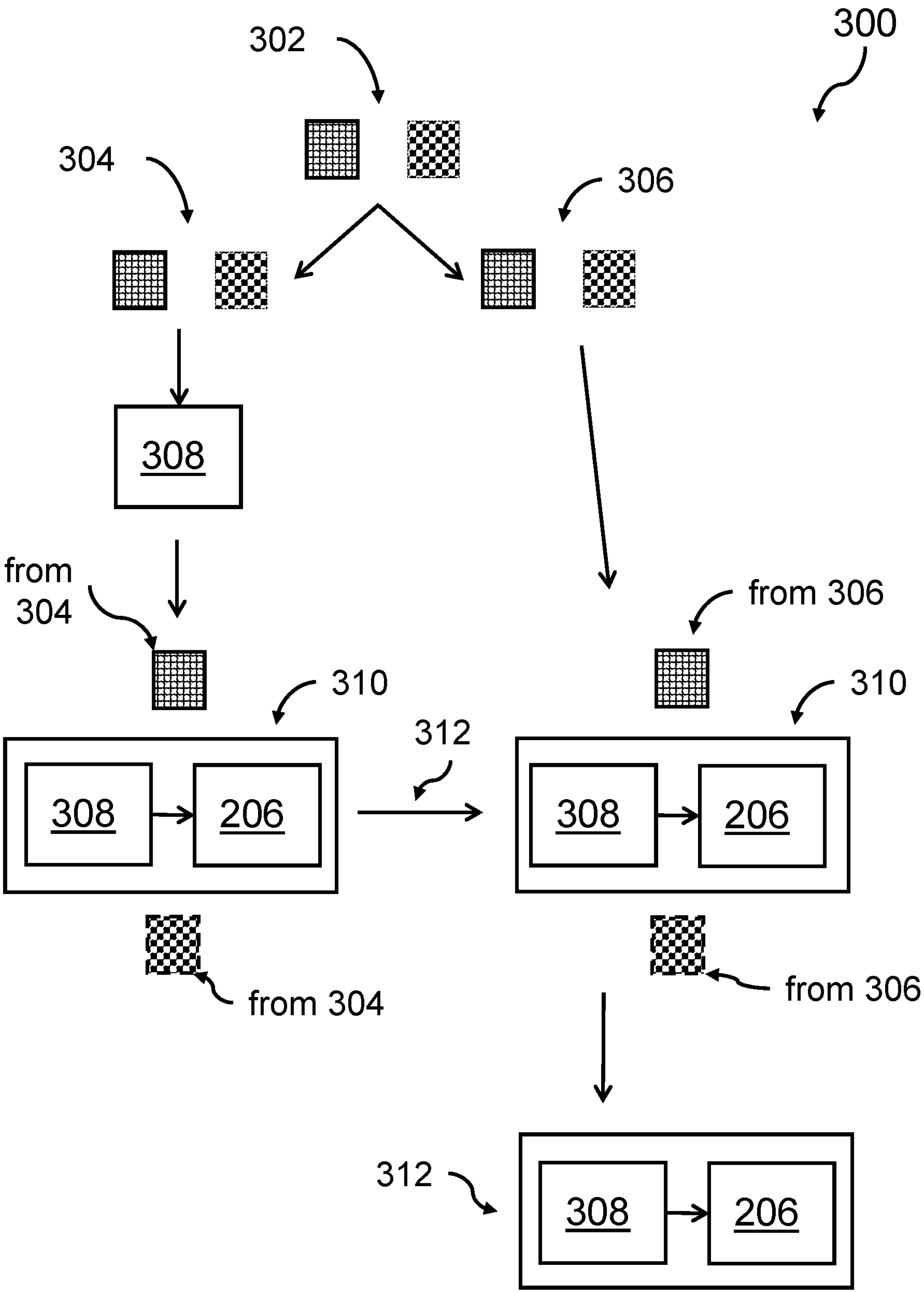

FIG. 3 depicts a block diagram of an embodiment of an activity flow of how to generate the super ML model as part of the combination of the feature mapper and the transformation system.

Figure 4:
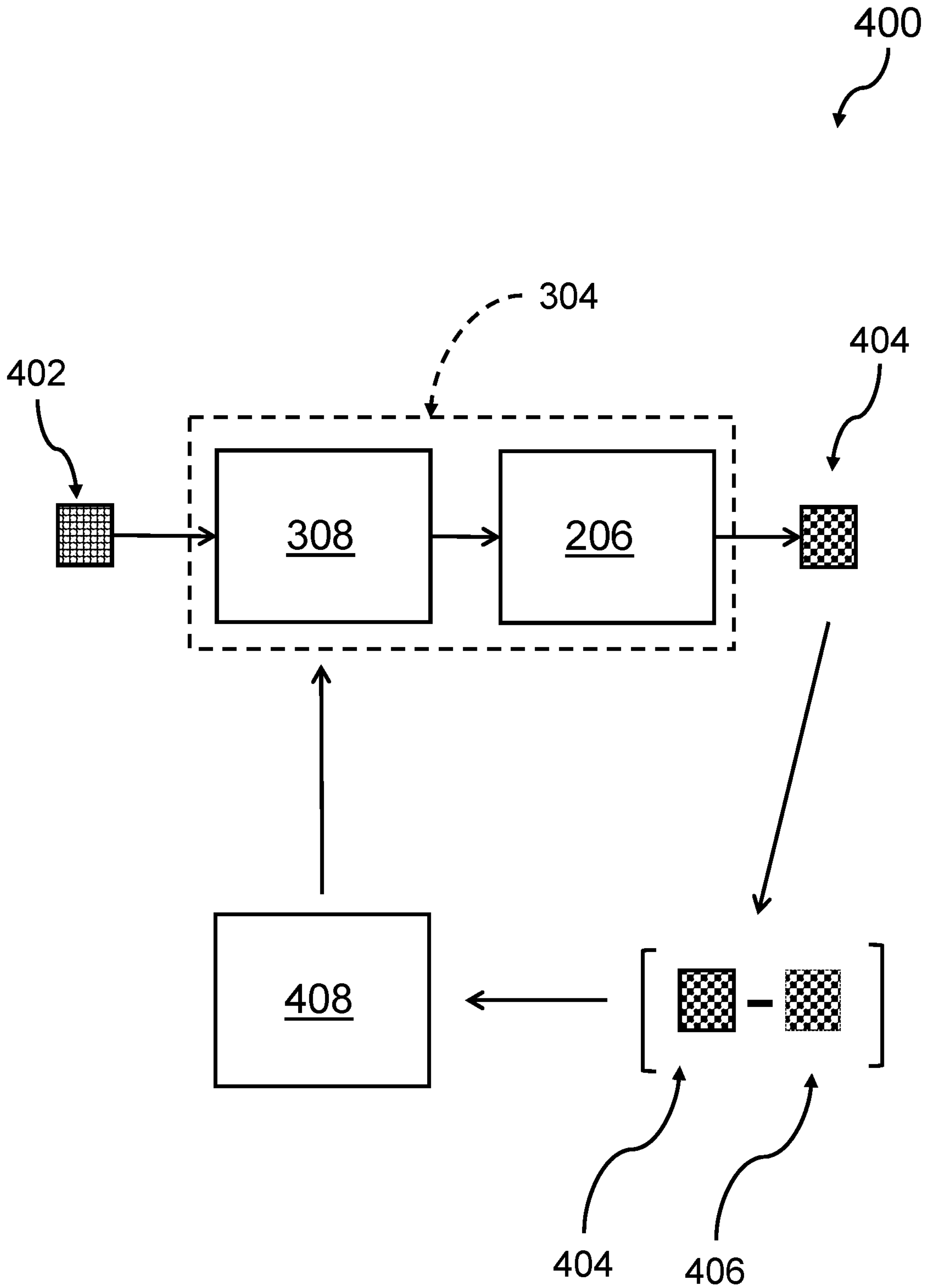

FIG. 4 depicts a block diagram of the training setup for the feature mapper of the combination of the feature mapper with the unchanged transformation system.

Figure 5:
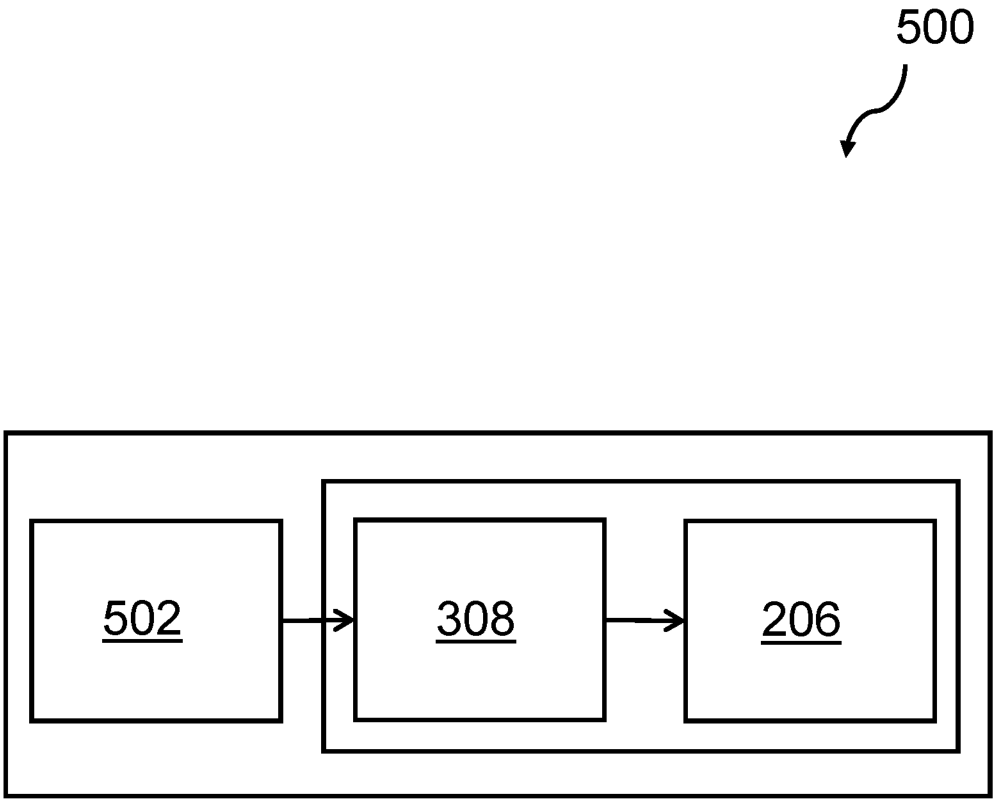

FIG. 5 depicts a simple block diagram of cascaded feature mappers.

Figure 6:
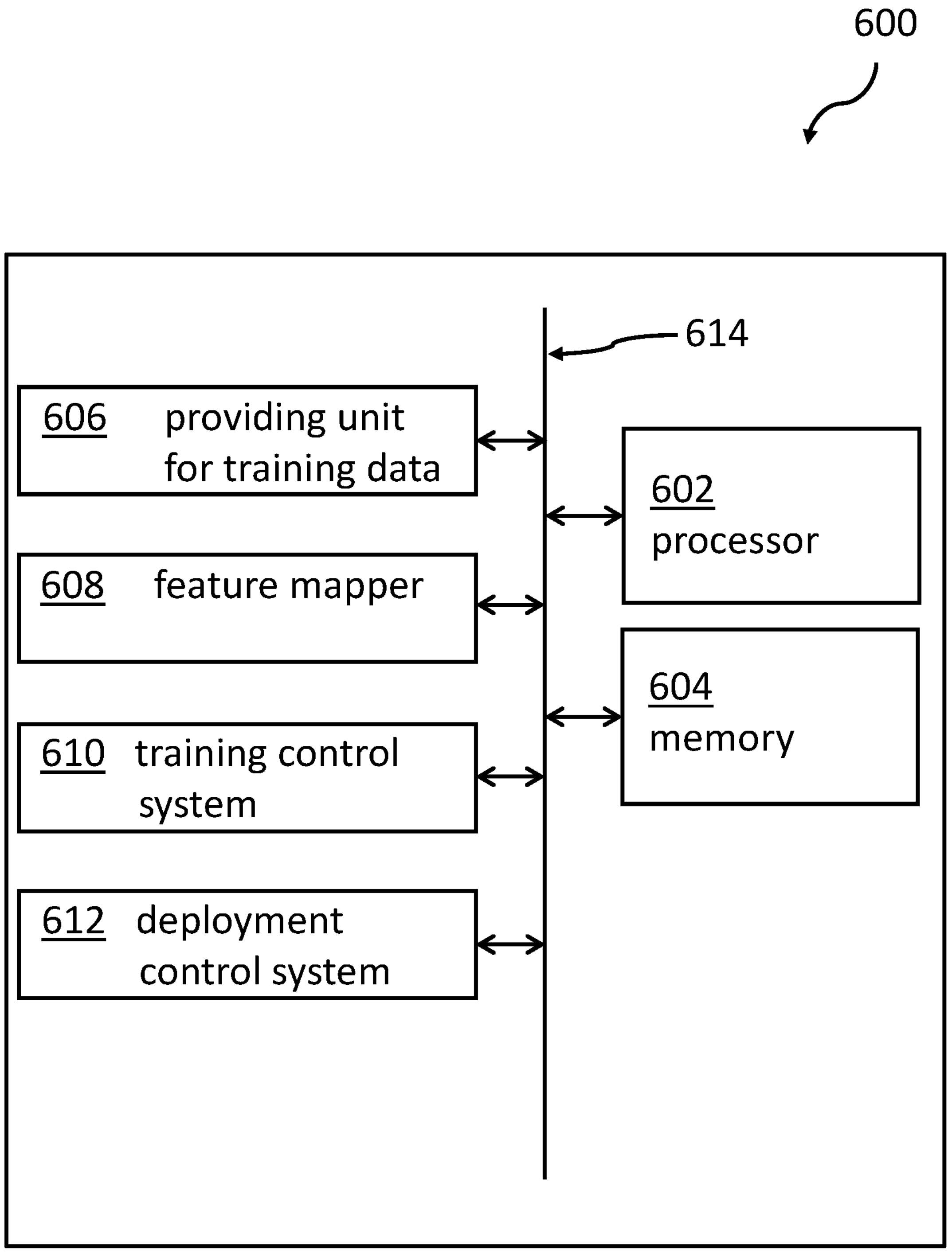

FIG. 6 depicts a block diagram of an embodiment of the inventive feature mapper creation system.

Figure 7:
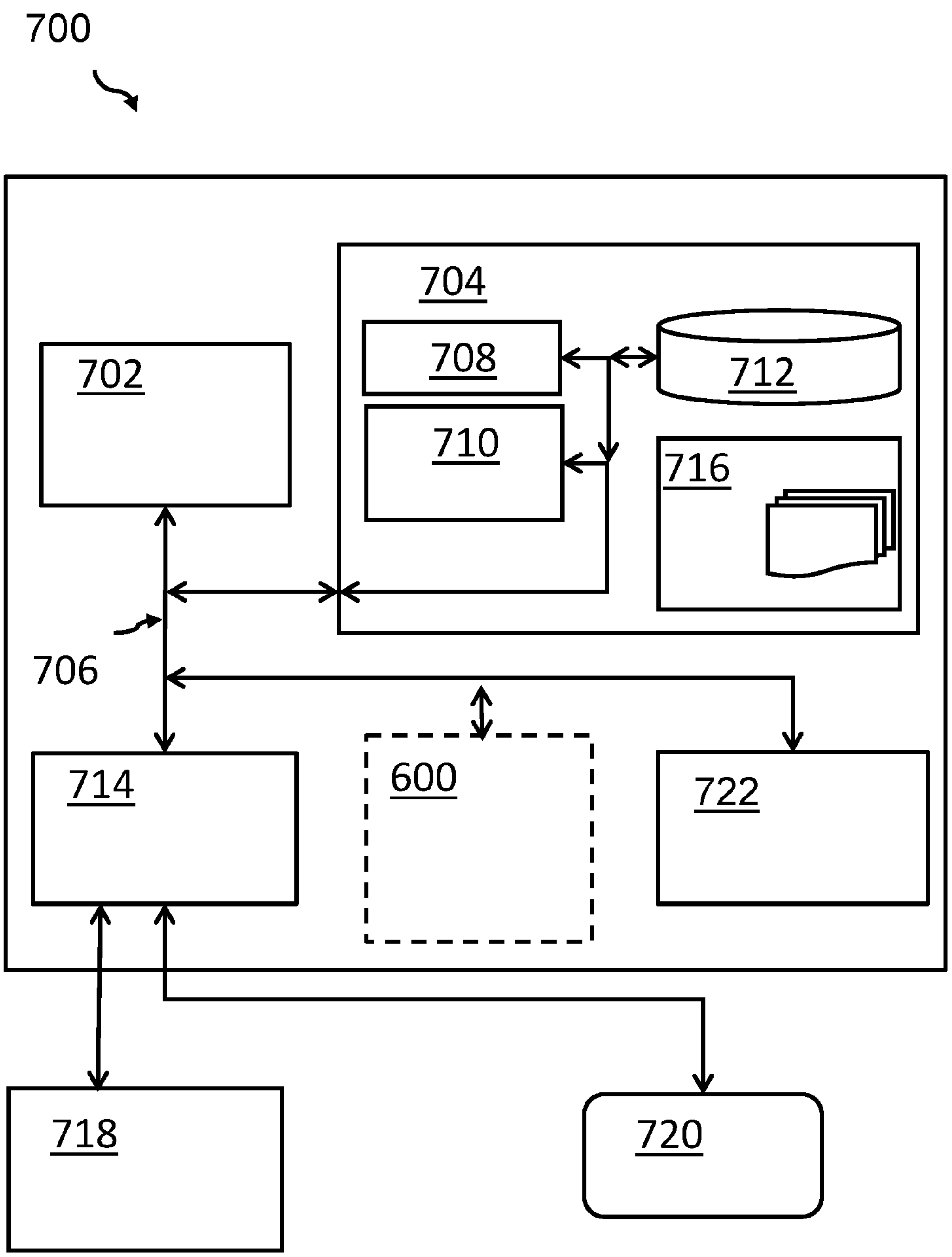

FIG. 7 depicts an embodiment of a computing system comprising the system according to FIG. 6.

DETAILED DESCRIPTION

In the context of this description, the following conventions, terms and/or expressions may be used:

The term 'transformation system' may denote comprising a transformation model built for a first setting using first input values, to incorporate second feature values present in a second setting.

The term 'transformation system' may denote a system transforming a set of input data to a set of output data. This may be achieved by a machine-learning system comprising a machine-learning model or any other decision support system like a rule-based network or a decision tree.

The term 'transformation model' may denote a set of parameters defining the behavior of the transformation system, like the architecture of the ML model in case of a machine-learning system, the number of layers in a decision tree and its related parameters, and so on.

The term 'first setting' may denote the first environment, in which the transformation system may have "learned" its behavior. It may relate to environmental parameter such as training input data as well as expected output values.

The term 'second setting' may denote a new environment being defined by new available input features (more or less than for the already available transformation system) as well as related input data and expected outputs.

The term 'training input data' may denote sets of input data and expected output data for a machine-learning (ML) system. Thereby, a ML system could be a (deep) neural network comprising nodes and connecting edges, wherein the nodes are organized in layers. Such a neural network may have an input layer an output layer, and one or more hidden layers in between. The training of the neural network may be performed by minimizing a cost function so that weighing factors (and potentially also parameter values of the nodes) are tuned over many cycles of training so that for a given set of input values, and the expected output value(s) is/are generated. The architecture of the neural network may be defined by a set of hyper-parameters (e.g., number of layers, number of layers per node, functions of certain layers of nodes, learning rate, etc.) and related values.

The term 'feature mapper' may denote a machine-learning model and a related system for generating output values for a defined set of input values that enable a generation of expected output values together with the above-mentioned transformation system.

The term 'machine-learning model' may denote the set of parameter values characterizing a machine-learning system (set of nodes and selectively connecting edges) which parameter values are determined during training.

The term 'super machine-learning system' may denote a combination of the transformation system and the machine-learning system of the feature mapper.

The term 'first training data' may denote those training data that have been used to create the behavior of the transformation system.

The term 'reinforcement learning method' may denote the known area of machine-learning concerned with how intelligent agents are to take actions in an environment in order to maximize the notion of a cumulative reward. Thereby, reinforcement learning differs from concepts like supervised learning in not needing labeled input/output pairs and not needing sub-optimal actions to be explicitly corrected. Instead, the focus is on finding a balance between exploration (of uncharted territory) and exploitation (of current knowledge). A reinforcement learning agent (RL agent) is positioned in a feedback loop comprising a machine-learning model and some kind of difference function between expected and actually produced results.

In the following, a detailed description of the figures will be given. All instructions in the figures are schematic. Firstly, a block diagram of an embodiment of the inventive computer-implemented method for enabling a transformation system comprising a transformation model built for a first setting using first input values, to incorporate second feature values present in a second setting is given. Afterwards, further embodiments, as well as embodiments of the feature mapper creation system for enabling a transformation system will be described.

Before turning to the figures directly, it may be useful to describe the assumptions and limitations. A general setup, it may be easy to imagine a credit rating system for which a black-box transformation system may have been provided to a bank. However, the proposed concept may also be used in a variety of other settings, like for an insurance company using the black-box transformation system is a risk assessment system being trained for one region which should be used for another region with different environmental conditions. Many more than different deployment examples would be imaginable by persons skilled in the art.

In the example of a credit rating model, such model may have been developed by a company in one country, i.e., for one setting A. However, either the bank or the credit rating model (in a trained form) was then acquired by another company in another country, i.e., under different setting B. Due to legal and/or other differences between the two countries, not all input features used in A are available in B. It should be mentioned that the mentioning of different countries are only for illustrative purposes; notable is that the situation A and B are different leading to the need for an adaption of the model A to the new situation (this will also be described in the context of FIG. 2.

The situation under consideration should then be taken as an example (easily being transferable to environmental or weather risk assessment by insurance companies):

A model is bought from a company in country A—e.g., the model has two inputs (address, income/revenue)—and creates a credit rating as an output.

- The model should be used in a new setting by a company in country B, where only other features are available, e.g., three features are available (job title, work experience, marital status). This may be due to different reasons, e.g., from a legal standpoint certain data are not allowed to be collected or used in credit ratings.
  - A dataset for B features is available (e.g., from a legacy credit rating model).
- The model is a complete black-box. One does not have any information regarding the inner functioning. One also does not know the meaning of the A features/input boxes in relation to the data that one has in country B.
- Running a model, i.e., putting in data and getting a result, is generally computationally cheap and not very time-consuming. The method proposed here makes use of this observation and requires eventually many executions of the given model.
- It shall also be assumed that it is a good model, which is correct in almost each test case from country A (i.e., the model performs very well with few mistakes for the A input data).
- One needs to figure out how to fill the input boxes now that the model is being used in country B. For example, one has a case of a person at a first address without a credit history and one needs to find out how to fill the boxes to properly represent this case and get the right answer by the model.
- Let's assume one has test cases for B (but not for A); i.e., a set of cases where feature values and expected results should be available (e.g., a person with a certain (bad) address with a long history of not repaying credits should be denied credit).
- Therefore, it is needed to map how the features available in country B can be transformed to achieve the most accurate use of the model from country A. It shall be assumed that one does not have knowledge of the meaning of the features, so it is not possible to trivially map features manually (e.g., company with a 110 year reputation versus a startup company burning money which doesn't make any progress in its business plan).

Assuming these settings, the newly proposed method will solve this dilemma.

FIG. 1 shows a block diagram of a preferred embodiment of the computer-implemented method 100 for enabling a transformation system comprising a transformation model built for a first setting using first input values, to incorporate second feature values present in a second setting. The method comprises—e.g., an analytic model, a role-based system or any other procedure as decision-support system or, in a special case, a trained ML system comprising a trained ML model—built for a first setting using first input values—i.e., a defined set of combinations of first input/output values to incorporate (potentially partially direct and/or partially via the feature mapper) second feature values present in a second setting.

The method 100 comprises providing, 102, training input data comprising second feature values relating to the second features—i.e., it may only be one feature value of one second feature—as well as expected second results—i.e., output value(s)—in the second setting. Additionally, the method 100 comprises providing, 104, a feature mapper comprising a machine-learning model (to be trained), wherein output signals of the feature mapper are used as input signals for the transformation system, thereby building a combination of the feature mapper and the transformation model. It should be noted that the number of output signals of the feature mapper and input signals of the transformation system do not have to be identical. However, such a situation may provide a comparably easy to handle special case.

Furthermore, the method 100 comprises training, 106, of the machine-learning model of the feature mapper using the training input data as input for the feature mapper and using the second results as expected output data of the transformation system, and, 108, deploying the combination of the feature mapper and the transformation system as a super machine-learning system comprising a super machine-learning model usable in the second setting.

FIG. 2 shows a block diagram of the assumed setting 200 to be overcome with the concept proposed here. Reference numeric 202 shows the first setting. The transformation model (in this case an ML model) 206 has been trained, 210, with training data 208. It may have been sold by a vendor to an enterprise customer. However, the setting has been changed to a new setting 204. Now, it turns out that another set of input data 212 has to be used for the black-box trained transformation system/ML system 206. However, this would not work, as described in more detail above.

FIG. 3 shows a block diagram of an embodiment of an activity flow 300 of how to generate the super ML model as part of the combination of the feature mapper 308 and the transformation system 206. A set of training input data 302 (left matrix) with related expected results (right matrix) are separated in a pair of datasets 304 for training and a second (potentially smaller) dataset 306 for a validation or test of the trained ML model.

Next, a feature mapper 308 may be designed and constructed and at least some output terminals of the feature mapper are connected to at least some input terminals of the transformation system 206. It does not need to be a one-to-one mapping between the output terminals and the input terminals. Some of the input data may be fed directly to the transformation system 206 of the combination 304 of the feature mapper 308 and the transformation system 206. Hence, the feature mapper 308 may have less output terminals than the transformation system 206 has input terminals. The input and output terminals may be real physical terminals or only virtual ones in an, e.g., ML model.

The combination 310 of the two systems 308, 206 is trained with the training input data 304 and the related expected results, both being a part of the original dataset pair 302. If a stop criterion for the training is met, the ML model comprised in the machine-learning system 308 together with the linked transformation system 206 is moved, 312, to testing for accuracy and reliability test using the test dataset 306. If the test is finished successfully, the combination of the ML model 308 and the transformation system 206 is deployed as the new combined system 312 for the second setting. Thereby, the transformation system 206 has not undergone any changes. Instead, it is used as originally provided. The next figure shows how this is achieved.

Thereby, it should be noted that—also in comparison to prior art (e.g., under the concept of "continual learning") the original model of the transformation system 308 is not changed and not re-trained. It stays unchanged in structure and behavior. As mentioned above, it may not be possible to re-train the original model because, e.g., no access to the original training data is possible and the model is a black-box. It could also be that even if it were possible to re-train the model, one may choose not to. This can be due to the computational effort or legal or organizational requirements.

The number of features in A and B (setting 202 vs. setting 204, compare FIG. 2), i.e., the quantities n (for the setting 202) and m (for the setting 204), could be quite different in size. This is not a problem, however, if n is much larger, the feature mapper could determine that none of the information in B is associated with some of the features in A possibly identical to that in A (so, they might, e.g., remain constant). If, on the other hand, m is much larger, the feature mapper 308 will likely find combinations of the B features which together represent a given A feature.

While some of the features in B may be identical to those in A and, thus, the feature mapper 308 finds a 1:1 association, the output of the feature mapper 308 generally yields its "artificial" values as input values to the model of the transformation system. This is to allow the data to be correctly entered in the input boxes/for the A features. If one of the feature input boxes only allows integer numbers between zero and 100 (e.g., representing an age), the feature mapper 308 would provide that as output. E.g., the artificial value for the first input box of the model, which may have been "income/revenue" in A, could be based on a combination of features in B such as "education", "address", and so on. If there are legal restrictions in B that need to be enforced, this can be done with hardcoded rules. E.g., if anyone under the age of 18 needs to be classified by the model in a certain way, this would be enforced with a rule that whenever the age feature for B is below 18, the model yields that output.

This process can be repeated whenever the environment in B is changing or the model needs to be transferred to yet another environment—in both cases, one may have a new setting C efficiently. For example, the super-model's predictions worsen over time or different data become available in B, e.g., due to changes in the legal and technical landscapes may allow a new feature to be included or require existing ones to be removed. Thus, the feature mapper is trained for setting C. This could be done by taking into account the feature mapper that maps from A to B. The feature mapper and C should then take the form of an A-C or a B-C mapping. Alternatively, the feature mapper for A-C or a B-C could be trained from scratch. This would allow for a continuous adaptation. The super-model will be retired if its predictions have worsened too much and can be improved through repeated learning.

Finally, in case the meaning of the input boxes/features in A is known one could add an embedding in order to match features in B to those in A via natural language processing methods.

FIG. 4 shows a block diagram 400 of the training setup for the feature mapper 308 of the combination 304 of the feature mapper 308 with the unchanged, original transformation system 206. Again, a set of input training data 402 and expected output values 404 is used for the combination 304. After the output values of the combination 304 have been generated from the input values 402, a net difference between the output values 404 and the expected results 406 of the prediction of the combination 304 is determined and used as input data for a reinforcement learning system/agent 408. Based on a report function as part of the reinforcement learning agent 408, the model parameters of the feature mapper 308 are adjusted cycle-wise until, e.g., the difference of the output values 404 and the expected results 406 are below a predefined threshold value (all based on other conditions).

Or, in other words, the process would be executed in 6 steps:

1. A neural network model of the feature mapper 308 is initialized as a feature mapper model with 3 features as an input (features available in B) and 2 model outputs (features needed for the model from A. This model has weights as well as hyper-parameters (e.g., learning rate) that can be tuned.
2. A reinforcement learning (RL) agent 408 is created.
3. This RL agent uses the available test data from B (inputs and correct output values) to create predictions (by passing the data through the feature mapper model and the model [i.e., transformations system] from A).

4. The reinforcement agent 408 uses the difference between the obtained model output and the desired output as a reward function (RL agent 408 is motivated to minimize the difference).
5. The RL agent 408 has as an action space (actions the agent can take to maximize his reward) which consists of changing the weights and hyper-parameters of the feature mapper 308 model.
6. The RL agent 408 is passing data into the feature mapper 308 model and adapting the feature mapper 308 configuration until one of a range of conditions is met, e.g., the RL agent 408 cannot find any more improvement to the system, a certain number of iterations have been carried out or a certain amount of time has elapsed.

In general, a range of supervised learning algorithms could be used to learn the feature mapping from B features to A features based on the dataset and test cases available for B.

The optimization can be stopped based on certain stopping criterions. For example, the optimization is halted when at least one of the following criterions is met:

1. Threshold accuracy/performance metric of the model (based on B test cases)—success.
2. Threshold time elapsed—success or failure.
3. Threshold number of iterations—success or failure.
4. Absence of improvements in accuracy/performance metric over a certain number of iterations—success or failure!

The accuracy and performance metric could be defined simply by how many of the B test cases are correctly reproduced/how well they are reproduced. Alternative metrics could be considered. E.g., it is likely generally desirable to avoid chaotic behaviour of the super-model where small changes in the input values produce very different results.

As an extension of the proposed concept, the following should be considered: One could extend the method with the following complementary method to reduce the complexity of the feature mapping that has to be performed by the feature mapper. Some of the feature mappings could be more efficiently found this way (e.g., identical features in A and B):

i. Test different values for each feature in A (these are the inputs for the model—e.g., 10 real-valued parameters) and build up information regarding the correlation between the model's output with the input values for each feature.
ii. Take the test cases for B (i.e., cases where the correct output for a certain set of feature values is known) and try entering this in different ways into the model's input boxes. For example, the number of times a credit has not been repaid may be an integer and vary from 0 to 10 in B. Thus, the values of 0 to 10 are entered in a box (with other boxes set to random values or values chosen by some other method) and then this process is repeated for all the other input boxes. The process is then repeated for all B features (and all input boxes). To reduce the number of different B feature/input box combinations, certain features become "locked" to input boxes once an "identical" match to a counterpart in A has been established. For example, if there is a B feature "age" with values 18 to 100 and entering these into the first input box yields reasonable predictions, the feature "age" is assigned to the first input box and only combinations of other features and input boxes are explored further.
iii. Compare the results of steps i and ii and categorize the B features into "identical", "similar", "no counterpart in A", . . . (e.g., via machine-learning).
iv. Apply the feature mapper to the remaining features, i.e., those in category "no counterpart in A" only or those in "no counterpart in A" and "similar". Of course, in special cases where, e.g., n=m and the features in B have all been assigned to "identical", applications of the feature mapper may not even be necessary.
v. Define final feature mapping based on iii and iv. For example, «identical» ones are entered exactly like they are into the appropriate input box/boxes, "similar" undergo the feature transformation found via the feature mapper before they are entered, "no counterpart in A" ones are ignored.
vi. Consider retiring the super-model when a threshold is met where too many B features fall into "no counterpart in A".

FIG. 5 shows a simple block diagram 500 of cascaded feature mappers 502 and 308. As explained above, the combination of the feature mapper 308 and the original transformation system 206 are not sufficient. Because it should be used in a new setting again, a further feature mapper 504 can be retrained together feature mappers 308 and the original transformation system 206 using the RL method, as described above, again.

For completeness reasons, FIG. 6 shows a block diagram of an embodiment of the creation of the feature mapper using the feature mapper creation system 600 for enabling a transformation system to incorporate second feature values present in a second setting. The feature mapper creation system comprises a processor 602 and a memory 604, communicatively coupled to the processor 602, wherein the memory 604 stores program code portions that, when executed, enable the processor 602, to provide training input data—in particular, by a providing unit 606 for training data—comprising second feature values relating to the second features as well as expected second results in the second setting, and to provide a feature mapper 608 comprising a machine-learning model, wherein output signals of the feature mapper are used as input signals for the transformation system, thereby building a combination of the feature mapper and the transformation model.

The processor 602 is also enabled to train—in particular by a training control system 610 (e.g., comprising the reinforcement learning system)—the machine-learning model of the feature mapper 608 using the training input data as input for the feature mapper and using the second results as expected output data of the transformation system, and to deploy—in particular by a deployment control system 612—the combination of the feature mapper and the transformation system as a super machine-learning system comprising a super machine-learning model usable in the second setting.

It shall also be mentioned that all functional units, modules and functional blocks—in particular, the processor 602, the memory 604, the providing unit 606, the feature mapper 608, the training system 610, and the deployment control system 612—may be communicatively coupled to one another for signal or message exchange in a selected 1:1 manner. Alternatively, the functional units, modules and functional blocks can be linked to a system internal bus system 614 for a selective signal or message exchange.

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both local, and remote, computer system storage media, including memory storage devices.

As shown in FIG. 7, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the feature mapper creation system 600 for enabling a transformation system may also be attached to the bus system 706.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor, or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments and is not intended to limit the invention. As used herein, the singular forms "a", "an", and "the" are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized by the following clauses:

1. A computer-implemented method for enabling a transformation system comprising a transformation model built for a first setting using first input values, to incorporate second feature values present in a second setting, the method comprising providing training input data comprising second feature values relating to the second features as well as expected second results in the second setting, providing a feature mapper comprising a machine-learning model, wherein output signals of the feature mapper are used as input signals for the transformation system, thereby building a combination of the feature mapper and the transformation model, training of the machine-learning-model of the feature mapper using the training input data as input for the feature mapper and using the second results as expected output data of the transformation system, deploying the combination of the feature mapper and the transformation system as a super machine-learning system comprising a super machine-learning model usable in the second setting.

2. The method according to clause 1, wherein the transformation system is a machine-learning system comprising a trained machine-learning mode which has been trained with first training data and related first results in the first setting.

3. The method according to clause 1 or 2, wherein internal details of the transformation system are unknown at the point in time of the training of the machine-learning model of the feature mapper.

4. The method according to any of the preceding clauses, wherein a reinforcement learning method is used for the training of the feature mapper.

5. The method according to any of the preceding clauses, also comprising separating the provided training input data into real training data and testing data, and validating the trained learning model of the feature mapper using the testing data.

6. The method according to any of the preceding clauses, wherein as stop criterion for the training of the machine-learning model of the feature mapper is one selected out of the group comprising a prediction threshold value, a threshold time value, a learning iteration threshold value, an iteration improvement threshold value.

7. The method according to any of the preceding clauses, wherein structured data, unstructured data and semi-structured data are usable as input data for the feature mapper.

8. The method according to any of the preceding clauses, wherein the number of input signals to the feature mapper is larger or smaller if compared to the number of input signals to the transformation model.

9. The method according to any of the preceding clauses, also comprising providing a first portion of the second feature values during the training of the machine-learning model to the input terminals of the feature mapper, and providing a remaining portion of the second feature values during the training of the machine-learning model directly to input terminals of the transformation system.

10. The method according to any of the preceding clauses, wherein the transformation system as well as the feature mapper is a classifier.

11. The method according to any of the preceding clauses, also comprising initializing the learning model of the feature mapper with a small number of input datasets for the feature mapper and a small number of prediction results of the feature mapper.

12. The method according to any of the preceding clauses, wherein the feature mapper is a cascaded feature mapper comprising a first feature mapper and a second feature mapper.

13. A feature mapper creation system for enabling a transformation system comprising a transformation model built for a first setting using first input values to incorporate second feature values present in a second setting, the feature mapper comprising a processor and a memory, communicatively coupled to the processor, wherein the memory stores program code portions that, when executed, enable the processor, to provide training input data comprising second feature values relating to the second features as well as expected second results in the second setting, provide a feature mapper comprising a machine-learning model, wherein output signals of the feature mapper are used as input signals for the transformation system, thereby building a combination of the feature mapper and the transformation model, train of the machine-learning model of the feature mapper using the training input data as input for the feature mapper and using the second results as expected output data of the transformation system, deploy the combination of the feature mapper and the transformation system as a super machine-learning system comprising a super machine-learning model usable in the second setting.

14. The feature mapper according to clause 13, wherein the transformation system is a machine-learning system comprising a trained machine-learning mode which has been trained with first training data and related first results in the first setting.

15. The feature mapper according to clause 13 or 14, wherein internal details of the transformation system are unknown at the point in time of the training of the machine-learning model of the feature mapper.

16. The feature mapper according to any of the clauses 13 to 15, wherein the training of the feature mapper is based on a reinforcement learning system.

17. The feature mapper according to any of the clauses 13 to 16, wherein the processor is also enabled to separate the provided training input data into real training data and testing data, and validate the trained learning model of the feature mapper using the testing data.

18. The feature mapper according to any of the clauses 13 to 17, wherein as stop criterion for the training of the machine-learning model of the feature mapper is one selected out of the group comprising a prediction threshold value, a threshold time value, a learning iteration threshold value, an iteration improvement threshold value.

19. The feature mapper according to any of the clauses 13 to 18, wherein structured data, unstructured data and semi-structured data are usable as input data for the feature mapper.

20. The feature mapper according to any of the clauses 13 to 19, wherein the number of input signals to the feature mapper is larger or smaller if compared to the number of input signals to the transformation model.

21. The feature mapper according to any of the clauses 13 to 20, wherein the processor is also enabled to provide a first portion of the second feature values during the training of the machine-learning model to the input terminals of the feature mapper, and provide a remaining portion of the second feature values during the training of the machine-learning model directly to input terminals of the transformation system.

22. The feature mapper according to any of the clauses 13 to 21, wherein the transformation system as well as the feature mapper is a classifier.

23. The feature mapper according to any of the clauses 13 to 22, wherein the processor is also enabled to initialize the learning model of the feature mapper with a small number of input datasets for the feature mapper and a small number of prediction results of the feature mapper.

24. The feature mapper according to any of the clauses 13 to 23, wherein the feature mapper is a cascaded feature mapper comprising a first feature mapper and a second feature mapper.

25. A computer program product for enabling a transformation system, comprising a transformation model build for a first setting using first input values, to incorporate second feature values present in a second setting, the computer program product comprising a computer readable storage medium having program instructions embodied therewith, the program instructions being executable by one or more computing systems or controllers to cause the one or more computing systems to:

provide training input data comprising second feature values relating to the second features as well as expected second results in the second setting;

provide a feature mapper comprising a machine-learning model, wherein output signals of the feature mapper are used as input signals for the transformation system, thereby building a combination of the feature mapper and the transformation model;

train of the machine-learning model of the feature mapper using the training input data as input for the feature mapper and using the expected second results as expected output data of the transformation system; and deploy the combination of the feature mapper and the transformation system as a super machine-learning system comprising a super machine-learning model usable in the second setting.

What is claimed is:

1. A method for enabling a transformation system comprising a transformation model built for a first setting using first input values, to incorporate second feature values present in a second setting, the method comprising:

providing training input data comprising second feature values relating to the second features as well as expected second results in the second setting;

providing a feature mapper comprising a machine-learning model, wherein output signals of the feature mapper are used as input signals for the transformation system, thereby building a combination of the feature mapper and the transformation model, wherein internal details of the transformation system, including architecture, parameters, and first training data used to build the transformation model are unavailable during training of the feature mapper, and the transformation model remains unmodified throughout training;

creating a reinforcement learning agent, wherein the reinforcement learning agent uses first input values and correct output values to create predictions of the combination of the feature mapper and the transformation model, wherein a training loop uses expected results from the second setting as a reward function;

training the machine-learning model of the feature mapper using the training input data as input for the feature mapper and using the expected second results as expected output data of the transformation system, the training being performed based solely on observed output differences of the transformation system, wherein the feature mapper learns to generate input signals that emulate input values of the first setting based on the second feature values, thereby enabling the transformation system to operate in the second setting; and deploying the combination of the feature mapper and the transformation system as a super machine-learning system usable in the second setting.

2. The method according to claim 1, wherein the transformation system is a machine-learning system comprising a trained machine-learning model which has been trained with first training data and related first results in the first setting.

3. The method according to claim 1, wherein a reinforcement learning method is used for the training of the feature mapper.

4. The method according to claim 1, further comprising:

separating the provided training input data into real training data and testing data;

validating the trained learning model of the feature mapper using the testing data; and testing, after training, a joint theoretical model of the feature mapper and the transformation system to define stop criterions for the training.

5. The method according to claim 1, wherein as stop criterion for the training of the machine-learning model of the feature mapper is one selected out of the group comprising a prediction threshold value, a threshold time value, a learning iteration threshold value, and an iteration improvement threshold value.

6. The method according to claim 1, wherein structured data, unstructured data, and semi-structured data are usable as input data for the feature mapper.

7. The method according to claim 1, wherein a number of input signals to the feature mapper is larger or smaller if compared to the number of input signals to the transformation model.

8. The method according to claim 1, further comprising:
providing a first portion of the second feature values during the training of the machine-learning model to input terminals of the feature mapper; and
providing a remaining portion of the second feature values during the training of the machine-learning model directly to input terminals of the transformation system.

9. The method according to claim 1, wherein the transformation system as well as the feature mapper is a classifier.

10. The method according to claim 1, further comprising:
initializing the learning model of the feature mapper with a small number of input datasets for the feature mapper and a small number of prediction results of the feature mapper.

11. The method according to claim 1, wherein the feature mapper is a cascaded feature mapper comprising a first feature mapper and a second feature mapper.

12. A feature mapper creation system for enabling a transformation system comprising a transformation model built for a first setting using first input values to incorporate second feature values present in a second setting, the feature mapper creation system comprising:
a processor and a memory, communicatively coupled to the processor, wherein the memory stores program code portions that, when executed, enable the processor to:
provide training input data comprising second feature values relating to the second features as well as expected second results in the second setting;
provide a feature mapper comprising a machine-learning model, wherein output signals of the feature mapper are used as input signals for the transformation system, thereby building a combination of the feature mapper and the transformation model, wherein internal details of the transformation system, including architecture, parameters, and first training data used to build the transformation model are unavailable during training of the feature mapper, and the transformation model remains unmodified throughout training;
create a reinforcement learning agent, wherein the reinforcement learning agent uses first input values and correct output values to create predictions of the combination of the feature mapper and the transformation model, wherein a training loop uses expected results from the second setting as a reward function;
train the machine-learning model of the feature mapper using the training input data as input for the feature mapper and using the expected second results as expected output data of the transformation system, the training being performed based solely on observed output differences of the transformation system,
wherein the feature mapper learns to generate input signals that emulate input values of the first setting based on the second feature values, thereby enabling the transformation system to operate in the second setting; and
deploy the combination of the feature mapper and the transformation system as a super machine-learning system comprising a super machine-learning model usable in the second setting.

13. The feature mapper according to claim 12, wherein the transformation system is a machine-learning system comprising a trained machine-learning model which has been trained with first training data and related first results in the first setting.

14. The feature mapper according to claim 12, wherein the training of the feature mapper is based on a reinforcement learning system.

15. The feature mapper according to claim 12, wherein the processor is also enabled to:
separate the provided training input data into real training data and testing data;
validating the trained learning model of the feature mapper using the testing data; and
testing, after training, a joint theoretical model of the feature mapper and the transformation system to define stop criterions for the training.

16. The feature mapper according to claim 12, wherein as stop criterion for the training of the machine-learning model of the feature mapper is one selected out of the group comprising a prediction threshold value, a threshold time value, a learning iteration threshold value, and an iteration improvement threshold value.

17. The feature mapper according to claim 12, wherein structured data, unstructured data, and semi-structured data are usable as input data for the feature mapper.

18. The feature mapper according to claim 12, wherein a number of input signals to the feature mapper is larger or smaller if compared to the number of input signals to the transformation model.

19. The feature mapper according to claim 12, wherein the processor is also enabled to:
provide a first portion of the second feature values during the training of the machine-learning model to input terminals of the feature mapper; and
provide a remaining portion of the second feature values during the training of the machine-learning model directly to input terminals of the transformation system.

20. The feature mapper according to claim 12, wherein the transformation system as well as the feature mapper is a classifier.

21. The feature mapper according to claim 12, wherein the processor is also enabled to:
initialize the learning model of the feature mapper with a small number of input datasets for the feature mapper and a small number of prediction results of the feature mapper.

22. The feature mapper according to claim 12, wherein the feature mapper is a cascaded feature mapper comprising a first feature mapper and a second feature mapper.

23. A computer program product for enabling a transformation system, comprising a transformation model build for a first setting using first input values, to incorporate second feature values present in a second setting, the computer program product comprising a computer readable storage medium having program instructions embodied therewith, the program instructions being executable by one or more computing systems or controllers to cause the one or more computing systems to:
provide training input data comprising second feature values relating to the second features as well as expected second results in the second setting;
provide a feature mapper comprising a machine-learning model, wherein output signals of the feature mapper are used as input signals for the transformation system, thereby building a combination of the feature mapper and the transformation model, wherein internal details of the transformation system, including architecture, parameters, and first training data used to build the transformation model are unavailable during training of the feature mapper, and the transformation model remains unmodified throughout training;

create a reinforcement learning agent, wherein the reinforcement learning agent uses first input values and correct output values to create predictions of the combination of the feature mapper and the transformation model, wherein a training loop uses expected results from the second setting as a reward function;

train the machine-learning model of the feature mapper using the training input data as input for the feature mapper and using the expected second results as expected output data of the transformation system, the training being performed based solely on observed output differences of the transformation system, wherein the feature mapper learns to generate input signals that emulate input values of the first setting based on the second feature values, thereby enabling the transformation system to operate in the second setting; and deploy the combination of the feature mapper and the transformation system as a super machine-learning system comprising a super machine-learning model usable in the second setting.

* * * * *